United States Patent [19]
Salonen

[11] 3,892,621
[45] July 1, 1975

[54] METHOD AND APPLICATION FOR APPLYING LIQUEFIED ADHESIVE MATERIAL

[76] Inventor: Albert R. Salonen, 560 Baxter Ave., Victoria, British Columbia, Canada

[22] Filed: Oct. 17, 1973

[21] Appl. No.: 407,319

[52] U.S. Cl.............................. 156/513; 156/578
[51] Int. Cl.² .................. B32B 31/00; B35C 11/04
[58] Field of Search .......... 156/252, 253, 578, 513

[56] References Cited
UNITED STATES PATENTS

| | | | |
|---|---|---|---|
| 2,890,481 | 6/1959 | Leahy et al. | 156/500 |
| 2,893,026 | 7/1959 | Sillars et al. | 156/578 |
| 3,350,249 | 10/1967 | Gregoire | 156/253 |
| 3,616,034 | 10/1971 | Obergfell | 156/513 |

*Primary Examiner*—Douglas J. Drummond

[57] ABSTRACT

An applicator for applying liquefied adhesive material to join as a laminate a plurality of sheet material wherein: (1) The sheets are located in close proximity prior to the application of the adhesive material. (2) The adhesive material is injected into the sheet material and between adjacent surfaces of the sheets, and issues from one or more orifices in a hollow member or needle-punch which is thrust into the laminate to pierce through only the outer layer or layers thereof. (3) Back-up action for the laminate to resist the needle-punch thrust is derived by having the needle-punch impelled into the laminate with a velocity sufficient so that inertial reaction from the mass of the laminate provides restraining action for the laminate against the penetrating thrust of the needle-punch. (4) The applicator comprises a needle-punch having an impeller means for imparting the aforesaid velocity thereto, a means for conveying pressurized, liquefied adhesive material to the needle-punch, and a valve means for releasing a flow of the liquefied material subsequent to or during the penetrating thrust of the needle-punch.

19 Claims, 3 Drawing Figures

METHOD AND APPLICATION FOR APPLYING LIQUEFIED ADHESIVE MATERIAL

This invention relates to an applicator for applying a liquefied adhesive material into and between adjacent layers of a plurality of sheet material for an adhesion as a laminate thereof.

Job applications wherein adhesives are applied in a hot molten condition to surfaces of sheet material for joining the sheets in laminate form become increasingly difficult or complex when large surfaces are involved because of surface chilling of the melt before the laminations can be brought into intimate contact. This becomes apparent when joining the enclosable coverflaps of cardboard cartons and more so if the surfaces of the cardboard have been pretreated with paraffin or a similar moisture-proofing material.

Therefore, an object of this invention is to provide an applicator for applying hot melt adhesive material to a laminate for an adhesion of the sheets to each other, by injecting the liquefied adhesive material into the sheet material and between adjacent surfaces of the laminate while the layers composing the laminate are located in close proximity prior to the application of the adhesive material; or as in the case of a cardboard carton, when the enclosable cover-flaps are in a closed position.

This can be accomplished by piercing the outer cover-flap from the outside of the carton by means of a hollow, needle-like punch; then immediately following the piercing operation by injecting the molten material, under pressure, between the outer and inner cover-flaps through one or more orifices provided in the hollow needle-punch.

The holding ability will be improved further if upon withdrawal of the needle-punch the pierced hole would be subsequently filled with a portion of the hot melt material. Upon cooling the small plug of material thus formed will give a deep holding ability similar to that of a rivet or staple.

Another object of this invention therefore is to inject hot molten adhesive material into pierced holes in a laminate to form upon cooling a rivet-like fastening, keyed and bonded to the laminate material.

Since the hot molten adhesive material is injected partly into the material proper composing the laminate, only the outer layers of the laminate need be pierced, while the innermost layer need be only partially penetrated.

Accordingly another object of this invention is to provide a fastening for the cover-flaps of cardboard cartons having some degree of deep holding ability, and to apply the aforesaid fastening to the cover-flaps without any hazard to the contents contained therein.

The insertion of a punch or needle into any material encounters some resistance, therefore some form of action to counteract the needle-punch thrust must be available; usually some form of support is used on the side opposite and in the immediate vicinity of a piercing-punch thrust. However, when only one side of a laminate material is accessible, such as for instance when the enclosable cover-flaps of a carton are already in a closed position, other means must be provided to counteract the pressure from the piercing-punch thrust to prevent the material from being merely pushed away by the punch.

Another object, therefore, of this invention is to utilize the inertial reaction which can be derived from the mass of a laminate material when a needle-punch is impelled into the laminate at a velocity; the velocity being sufficient so that this reaction, when combined with some support from any inherent stiffness of the laminate sheets, can be used to advantage for providing the necessary counter thrust to the piercing operation.

The inertial mass of the laminate material is most effective when the needle-punch has a velocity imparted thereto prior to striking the laminate surface; therefore, should the needle-punch point be close to or resting on the surface of the laminate prior to the piercing thrust, it must acquire practically an instantaneous acceleration. Such an acceleration may be derived by having a rapidly travelling hammer strike a relatively less massive needle-punch.

For imparting to the hammer the necessary velocity prior to striking the needle-punch, one of several methods may be employed. One possibility is a solenoid coil which would be energized by an electric current, while another is a piston and cylinder arrangement using compressed air or gas; the hammer serving as a solenoid armature in the first instance and as the piston in the second.

Another method which is explained in detail in the following text is to store mechanical energy by compressing a helical spring against the aforesaid hammer, and then releasing the hammer with a trip mechanism.

FIG.. 3 is an enlarged view in section of the laminate after the needle-punch has been impelled through the outer layer and into the inner layer and then withdrawn therefrom, and showing the plastic material in the pierced hole.

Figure 1:
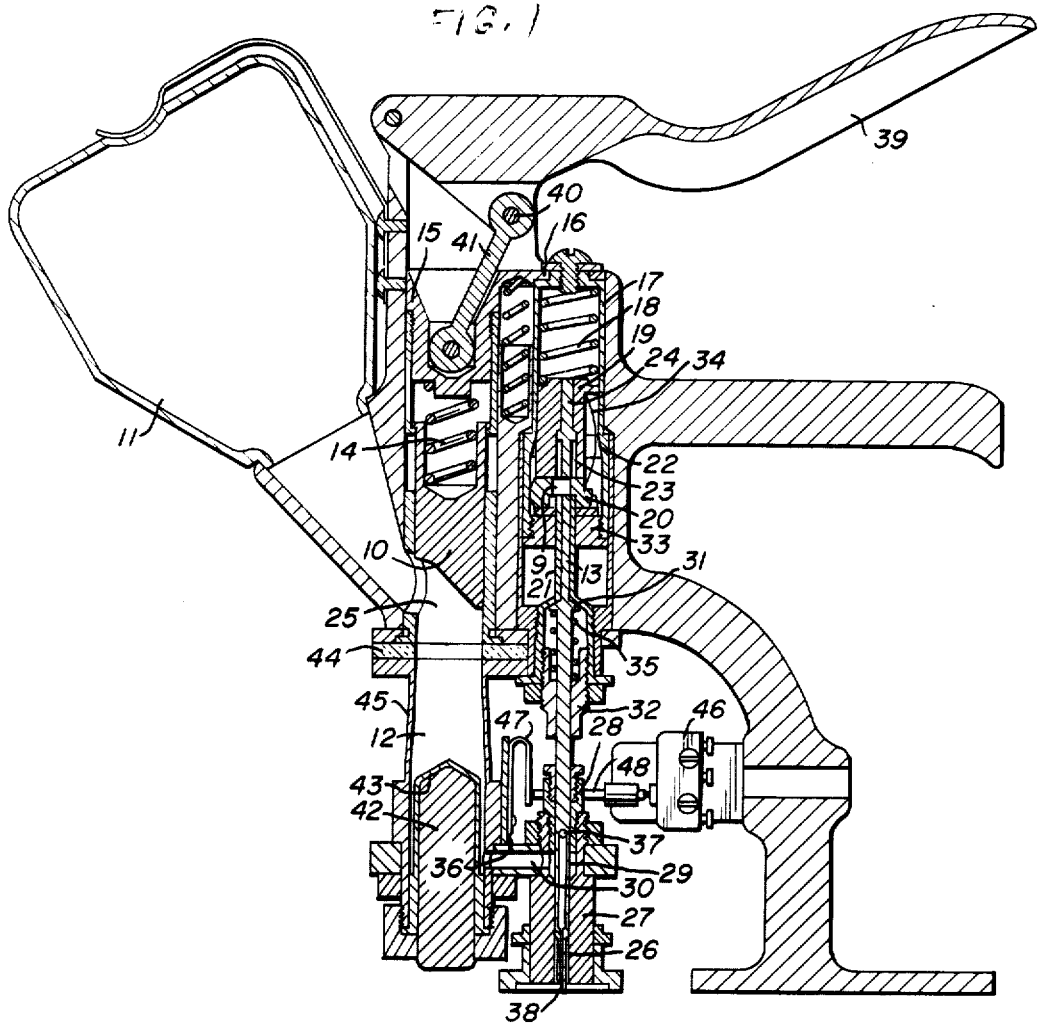
FIG. 1 is a side view in section form showing a portable hand-operated applicator embodying principles of the invention.
Figure 2:
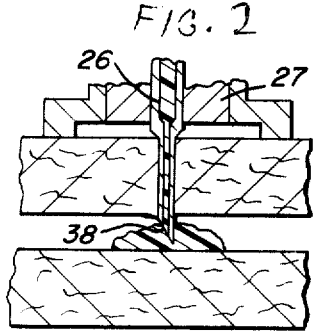
FIG. 2 is an enlarged side view in section of the needle-punch after being impelled through one layer of a laminate and showing the plastic material injected between the sheets.
Figure 3:
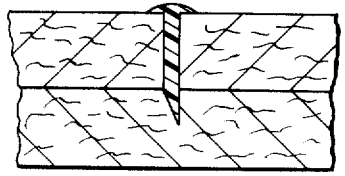

FIG. 1 illustrates an applicator which utilizes plastic material in a granular or pellet form contained in a detachable supply cartridge; comprising a cylinder to receive the pellets which are fed by gravity from the cartridge, a piston to push the pellets into a heating chamber, a pressure limiting spring which couples the piston to its propulsion drive and operates to maintain a pressure on the plastic material during ejection thereof, a passageway or duct for conveying liquid plastic from the heating chamber to a needle-punch, a spring actuated mechanism coupled to the piston drive which is operable to impart to the needle-punch the necessary motion to pierce the laminate material, and a sliding valve incorporated in part within the duct and in part within the needle-punch and which operates to release a flow of liquid plastic material when the needle-punch has been driven into the laminate.

At the beginning of the operating cycle, a piston 10 pushes pellets of plastic material supplied from a container 11 into a heating chamber 12 of the applicator. The molten material therein is prevented from being ejected by a closed sleeve type valve comprising a needle-punch 26, a guide member 27, and a valve nut 28. Since the plastic material is pelletized and possesses some elasticity in the cooler regions near the piston head, it is compressed to some extent. Beyond a predetermined pressure, a precompressed spring 14 is compressed further, thereby permitting the rearward portion 15 of a composite piston assembly to continue its forward travel. The rearward portion 15, simultaneously by means of an attached lug 16 pushes a cylindrical member 17 and the rearward portion of a spring 18 also forward, thereby compressing the spring 18 against a hammer 19.

The hammer is prevented from moving forward by a sliding sear 20; the sear, being mounted athwart and within the hammer 19, is pushed against the rearward end of a tubular restraining member 21.

When the rearward portion 15 of the piston assembly and the cylindrical member 17 have travelled a predetermined distance, a ramp 22 provided within the bore of the cylindrical member, by pressing inward on the sliding sear 20, brings an opening 9 which is provided in the sear 20 into coaxial alignment with the tubular member 21; the opening in the sear being large enough to accomodate the end of the tubular member 21 removes the restraint to the hammer 19 which permits the hammer to be propelled by the pressure from the spring 18.

Constructed within the hammer 19 is a cavity 23 containing therein a hammer punch 24, which being small enough to slide within the bore of the tubular member 21 and being carried forward by the hammer 19, after accelerating somewhat, strikes a valve rod 13. The impact imparts a forward velocity to the valve rod 13 approaching twice that of the hammer 19, particularly when the materials involved in the collision are not strained beyond the elastic limit; the situation being one of an elastic collision between bodies having a relatively large mass ratio.

The valve rod 13 is firmly fastened to the hollow needle-punch 26 which is similarly propelled forward.

The needle-punch 26, being a close sliding fit in the guide member 27 and the valve nut 28, effectively stops any flow of liquid adhesive material when in its rearward or retracted position because the valve nut 28 covers holes 37 in the body or sidewalls of the needle-punch. An annulus cavity 29 formed by the guide member 27 and the valve nut 28 is connected to the heating chamber by a passageway or duct 30.

When the needle-punch is impelled forward as outlined in the foregoing it pierces the outer member of the cardboard sheet in a manner similar to a rapidly travelling projectile; inertial reaction from the mass of the material composing the cardboard sheets providing a counter thrust against the piercing thrust of the needle-punch. Simultaneously with the aforesaid action the holes 37 in the sidewalls of the needle-punch are uncovered by entering the region of the annulus cavity 29. This permits the liquid material, which is under pressure, to flow through the needle-punch body and to be ejected from an orifice hole 38 in the needle-punch point.

Pressure is maintained on the adhesive material during ejection by the combined action of pressure from the spring 14 and pressure from the elasticity of the unmelted plastic pellets near the piston head. Additional forward travel of the rearward portion 15 of the piston assembly is available, if required, to time the valve operation at the needle-punch, but imparts no further motion to the hammer 19 or the valve rod 13. The valve rod is arrested in its forward travel by an integral collar 31 contacting an adjustable sleeve 32, while the hammer is again restrained by the end of the tubular member 21 contacting the bottom of the cavity 23. Any additional forward travel of the cylindrical member 17 is of no consequence; merely compressing the spring 18.

The depth of penetration of the needle-punch into the laminate is adjustable by repositioning the sleeve 32.

Upon retraction of the piston assembly and the cylindrical member 17, the hammer is picked up by a plug 33 which is fastened onto the end of the cylindrical member 17, and moves it to its original rearward position so that the sear 20 is free and clear of the tubular member 21, thereby permitting a leaf spring 34 to reposition the sear. At the same time a spring 35 retracts the valve rod 13 and the needle-punch 26; the action cutting off the flow of liquid from the latter.

A fresh charge of plastic pellets is now free to fall into the cylinder 25; the cycle can then be repeated.

The operating portion of the device which has been described this far may derive the necessary mechanical force for its operation from a hand-operated lever member 39 through a journal pin 40 and a connecting rod 41, but may be adapted for motor driven power by substituting a motor driven crankpin for the journal pin 40.

The units may be battery mounted to give simultaneous operation over a greater area which may then have the piston propulsion by electrical solenoids, interconnected crankshafts or cams, compressed air or screw mechanisms.

The plastic material is melted by heat from an electric heating element 42 which is mounted in the heating chamber at a location to apply part of the heat to a spreader core 43 mounted therein.

The needle-punch, valve and duct are maintained at approximately the same temperature as the heating chamber 12 by heat being conducted along the relatively short housing of the duct 30.

A thermostat for controlling the heating element 42 comprises a strip of bimetal 47 mounted on the housing 36 of the duct at a location midway between the heating chamber and the needle-punch and valve, and is coupled by a push rod 48 to a miniature micro-switch 46. The heating element is connected in series with the micro-switch and an electrical power conductor cord, and may derive electrical energy from a suitable electrical outlet.

The nature of the operating cycle of the device is one which maintains a pressure on the plastic material for an appreciable length of time and gives rise to a problem in that liquefied plastic material from the heating chamber tends to percolate back through the wad of unmelted plastic pellets adjacent the piston head. Should the molten material contact the piston head or the cylinder bore walls it can cause sticking of unmelted pellets to the piston head or cylinder bore walls, which in turn will interfere with feeding of additional pellets into the cylinder bore 25.

To eliminate the above problem in the relatively small spaces dictated by a conveniently sized device, a thermal insulating washer 44 is installed to thermally isolate the heating chamber from the cylinder barrel; and in addition the walls 45 of the heating chamber adjacent the cylinder barrel are constructed as thin as possible commensurate with adequate strength to restrict conduction of heat along the walls to the cylinder barrel. To enhance the passage of the aforesaid wad of unmelted plastic pellets through the heating chamber, the portion of the heating chamber 45 just beyond the piston head is constructed to have a gradually increasing diameter as it approaches the heating core 43; this tends to reduce the pressure on the confining walls as the wad passes therethrough and correspondingly decreases the frictional resistance thereof.

It is to be understood that the applicator portion of the device, that is the needle-punch with its impeller and the valve for releasing the plastic material, may be a unit having a thermostatically controlled heater, and may be physically a separate entity from the liquid plastic supply unit; the two units then being joined in communication with each other by means of a thermostatically controlled and heated duct. The heated duct may be either flexible or rigid to suit individual requirements.

The device is simple to use and does not require hand pressure from the operator beyond normal activity levels. In an operation such as for example sealing a cardboard carton, the device is rested lightly against the outer carton flap to bring the flap close to but not into intimate contact with the inner flap. The lever 39 is then squeezed to actuate one cycle. The needle-punch penetrates the outer flap in accordance with the aforesaid precepts and the hot liquid plastic is injected between the adjacent surfaces of the inner and outer flap. The outer flap is now pressed down to spread the molten material by bringing the adjacent surfaces into intimate contact, and held for a short period of time until the hot liquid material cools and hardens. The above process may be repeated several times at appropriate locations to hold the carton flaps together against any springiness of the carton material, after which the operator may very quickly operate the device like a staple gun to install rivet-like fastenings wherever deemed necessary. In the latter operation, the needle-punch pierces the outer flap and partially penetrates the inner flap; then lifting the device to withdraw the needle-punch while holding the lever squeezed down fills the pierced hole with liquid plastic which forms upon cooling a rivet-like plastic plug.

Thus, the aforenoted objects and advantages are effectively attained. Although several preferred embodiments of the invention have been disclosed therein, it should be understood that the present invention is in no sense limited thereby and should be determined by the scope of the appended claims.

What I claim is:

1. An applicator for applying an adhesive bond to fasten together overlapping layers of sheet material, comprising a body portion provided with a working face for placing against an outer surface of said layers, at least one member mounted protusibly in said face, a spring means mounted within said body portion, means for deflecting said spring means to impress mechanical energy therein, a releasable means for effecting releasable restraint of said spring means at a portion thereof to constrain the force acting on said portion when said spring means is deflected, a tripping means operatively associated with said releasable means for releasing said portion from said restraint when said spring means is deflected a predetermined amount; said portion, therefore, being operative to transfer said energy from said spring means to a means responsive to said force for impelling said member outwardly from said face so that said member is driven at a velocity into said surface to penetrate the material of said layers; said velocity being sufficient for the inertia-mass of said material to cause a counteractive force within said material against the thrust of said member thereby providing effective support to said layers during penetration thereof by said member, means for limiting said penetration to one or more outer layers of said material and to partial penetration of the last layer thereof, and means for injecting heated thermoplastic fluid into openings formed by said member to penetrate through the thickness of said outer layers and into said last layer and spread laterally at the interface therebetween; whereupon the heated fluid cools and hardens in place to provide fastenings securing said outer layers to said last layer; said injecting means including means for conveying heated thermoplastic fluid under pressure to a valve means which is operative to release a charge of said fluid into said openings subsequent to the penetrating thrust of said member.

2. The applicator as claimed in claim 1, wherein means are provided for forcing a predetermined amount of solid granular thermo-plastic material through a heating chamber to convert said material into said fluid.

3. The applicator as claimed in claim 1, wherein means are provided for maintaining said conveying means and said valve means at a predetermined temperature.

4. An applicator for applying an adhesive bond to fasten together overlapping layers of sheet material, comprising a body portion provided with a working face for placing against an outer surface of said layers, at least one member mounted protusibly in said face, means for impelling said member outwardly from said face so that said member is driven at a velocity into said surface to penetrate the material of said layers; said velocity being sufficient for the inertia-mass of said material to cause a counteractive force within said material against the thrust of said member thereby providing effective support to said layers during penetration thereof by said member; said impelling means including a hammer means operable to impart said velocity to said member by an impact therefrom, means for limiting said penetration to one or more outer layers of said material and to partial penetration of the last layer thereof, and means for injecting heated thermoplastic fluid into openings formed by said member to penetrate through the thickness of said outer layers and into said last layer and spread laterally at the interface therebetween; whereupon the heated fluid cools and hardens in place to provide fastenings securing said outer layers to said last layer; said injecting means including means for conveying heated thermoplastic fluid under pressure to a valve means which is operative to release a charge of said fluid into said openings subsequent to the penetrating thrust of said member.

5. An applicator for applying an adhesive bond to fasten together overlapping layers of sheet material, comprising a body portion provided with a working face for placing against an outer surface of said layers, at least one member mounted protusibly in said face, means for impelling said member outwardly from said face so that said member is driven at a velocity into said surface to penetrate the material of said layers; said velocity being sufficient for the inertia-mass of said material to cause a counteractive force within said material against the thrust of said member thereby providing effective support to said layers during penetration thereof by said member; said impelling means comprising a frame attached to said body portion for supporting said member; a barrel mounted on said body portion at a location opposite said member coaxially thereof; a cylindrical member having in the body thereof a coaxial cavity provided with an opening toward said member and being reciprocally mounted within the bore of said barrel; a helical spring mounted within said cavity; a tubular restraining member affixed to said barrel and having one end thereof extending into said cavity; a hammer means interposed between said helical spring and said restraining member and being reciprocally mounted within said cavity coaxially thereof; a reciprocatory means mounted on said body portion for reciprocating said cylindrical member within said bore and being operable to compress said spring against said hammer means on each operating cycle thereof; and a trip means constructed in part within said cavity and in part within said hammer means and being operable to release said hammer means from said restraining member for imparting said velocity to said member when said cylindrical member is pushed by said reciprocatory means a predetermined distance toward said member, means for limiting said penetration to one or more outer layers of said material and to partial penetration of the last layer thereof, and means for injecting heated thermoplastic fluid into openings formed by said member to penetrate through the thickness of said outer layers and into said last layer and spread laterally at the interface therebetween; whereupon the heated fluid cools and hardens in place to provide fastenings securing said outer layers to said last layer; said injecting means including means for conveying heated thermoplastic fluid under pressure to a valve means which is operative to release a charge of said fluid into said openings subsequent to the penetrating thrust of said member.

6. The applicator as claimed in claim 5, wherein means are provided for transmitting an impact from said hammer means through the bore of said tubular restraining member to said member.

7. An applicator for applying an adhesive bond to fasten together overlapping layers of sheet material, comprising a body portion provided with a working face for placing against an outer surface of said layers, at least one member mounted protusibly in said face, means for impelling said member outwardly from said face so that said member is driven at a velocity into said surface to penetrate the material of said layers; said velocity being sufficient for the inertia-mass of said material to cause a counteractive force within said material against the thrust of said member thereby providing effective support to said layers during penetration thereof by said member, means for limiting said penetration to one or more outer layers of said material and to partial penetration of the last layer thereof, and means for injecting heated thermoplastic fluid into openings formed by said member to penetrate through the thickness of said layers and into said last layer and spread laterally at the interface therebetween; whereupon the heated fluid cools and hardens in place to provide fastenings securing said outer layers to said last layer; said injecting means including means for conveying heated thermoplastic fluid under pressure to a valve means which is operative to release a charge of said fluid into said openings; said valve means comprising a cavity located adjacent the body of said member and communicating with said conveying means, and an axial passageway in said member communicating with one or more radial passage holes provided in said body at a location so that said cavity is operable to release a charge of said fluid through said holes into said passageway subsequent to the penetrating thrust of said member.

8. An applicator for applying an adhesive bond to fasten together overlapping layers of sheet material, including a body portion provided with a working face for placing against an outer surface of said layers, at least one member mounted protusibly in said face, means for impelling said member outwardly from said face so that said member is driven at a velocity into said surface to penetrate the material of said layers; said velocity being sufficient for the inertia-mass of said material to cause a counteractive force within said material against the thrust of said member thereby providing effective support to said layers during penetration thereof by said member, means for limiting said penetration to one or more outer layers of said material and to partial penetration of the last layer thereof, and means for injecting heated thermoplastic fluid into openings formed by said member to penetrate through the thickness of said outer layer and into said last layer and spread laterally at the interface therebetween; whereupon the heated fluid cools and hardens in place to provide fastenings securing said outer layers to said last layer; said injecting means including means for conveying heated thermoplastic fluid under pressure to a valve means which is operative to release a charge of said fluid into said openings subsequent to the penetrating thrust of said member; comprising a barrel member the bore of which in in communication with said valve means; a piston mounted to reciprocate in the bore of the said barrel member coaxially thereof; a heating chamber interposed between and communicating with said barrel member and said valve means; a reciprocatory means mounted on said body portion and operable to effect reciprocation of said piston; and means for mounting on said body portion a supply of material that is to be melted, and operative each time said piston moves in a direction away from said heating chamber to deliver a charge of said material into said bore between said piston and said heating chamber to be forced by said piston successively through said chamber and said valve means and out of one or more orifices provided in said member.

9. The applicator as claimed in claim 8, wherein said piston is coupled to said reciprocatory means with a means operable to regulate and maintain a pressure on said material during the ejection thereof.

10. The applicator as claimed in claim 8, further characterized by having said reciprocatory means manually powered to effect the reciprocation of said piston.

11. The applicator as claimed in claim 8, including a motor powered means to effect the reciprocation of said piston.

12. The applicator of claim 8, further characterized in that a metallic cylindrical core is mounted in said heating chamber in radially spaced relation to the wall of said chamber, so that the material to be melted passes axially through said chamber around the outside of said metallic core on its way to said valve means; said heating chamber being provided with at least one heating element for heating said material; and said wall having thermal restriciting means for preventing the transfer of heat from said heating chamber to said barrel.

13. The applicator of claim 12, wherein said heating element is at least partially located within said core.

14. The applicator of claim 12, wherein said thermal restricting means includes a heat insulating washer at a location between said heating chamber and said barrel for effectively terminating conduction of heat along said wall to said barrel.

15. The applicator of claim 12, wherein adjacent said barrel, the wall of said heating chamber is substantially thinner than the wall of said barrel thereby to restrict the conduction of heat from said heating element to said barrel.

16. The applicator of claim 12, wherein said heating element is provided with thermostat heat control means.

17. The applicator of claim 15, wherein the portion of the heating chamber enclosed by said wall is tapered outwardly in the direction toward said heating element.

18. The applicator of claim 5, further characterized by having said reciprocatory means manually powered to compress said spring against said hammer means.

19. The applicator of claim 5, including a motor powered means for reciprocating said cylindrical member within said bore.

* * * * *